(12) United States Patent
Diep et al.

(10) Patent No.: US 10,926,858 B2
(45) Date of Patent: Feb. 23, 2021

(54) PRESSURE BULKHEAD SYSTEM

(71) Applicant: The Boeing Company, Chicago, IL (US)

(72) Inventors: Paul B. Diep, Bothell, WA (US); Bernhard Dopker, Bellevue, WA (US); Rosario Vingiani, Seattle, WA (US)

(73) Assignee: The Boeing Company, Chicago, IL (US)

( * ) Notice: Subject to any disclaimer, the term of this patent is extended or adjusted under 35 U.S.C. 154(b) by 604 days.

(21) Appl. No.: 15/670,829

(22) Filed: Aug. 7, 2017

(65) Prior Publication Data

US 2019/0039711 A1 Feb. 7, 2019

(51) Int. Cl.
| | | |
|---|---|---|
| B64C 1/10 | (2006.01) | |
| B64C 1/12 | (2006.01) | |
| B64C 1/06 | (2006.01) | |

(52) U.S. Cl.
CPC ............ *B64C 1/10* (2013.01); *B64C 1/064* (2013.01); *B64C 1/069* (2013.01); *B64C 1/12* (2013.01)

(58) Field of Classification Search
CPC .......... B64C 1/10; B64C 1/069; B64C 1/064; B64C 1/12; B64C 1/068; B64C 2001/0072; B64C 1/061; B64C 3/185; B64C 2001/009

See application file for complete search history.

(56) References Cited

U.S. PATENT DOCUMENTS

| | | | |
|---|---|---|---|
| 5,062,589 A | 11/1991 | Roth et al. | |
| 8,226,870 B2* | 7/2012 | Garcia Laja | ............ B64C 1/10 |
| | | | 264/238 |
| 2007/0164159 A1 | 7/2007 | Koch et al. | |
| 2010/0230539 A1* | 9/2010 | Mischereit | ............ B64C 1/10 |
| | | | 244/119 |
| 2010/0243806 A1* | 9/2010 | Vera Villares | ........... B64C 1/10 |
| | | | 244/119 |
| 2011/0233334 A1* | 9/2011 | Stephan | ................... B64C 1/10 |
| | | | 244/119 |
| 2013/0087657 A9 | 4/2013 | Koch et al. | |
| 2014/0370227 A1 | 12/2014 | Diep et al. | |
| 2017/0327199 A1* | 11/2017 | Grase | ..................... B64C 1/068 |

FOREIGN PATENT DOCUMENTS

| | | |
|---|---|---|
| DE | 102007063608 A1 | 11/2008 |
| EP | 2682340 A2 | 1/2014 |
| EP | 2813425 A1 | 12/2014 |
| WO | WO2010003818 A2 | 1/2010 |

OTHER PUBLICATIONS

European Patent Office Extended Search Report, dated Oct. 22, 2018, regarding Application No. 18167637.0, 8 pages.

* cited by examiner

*Primary Examiner* — Medhat Badawi
*Assistant Examiner* — Vicente Rodriguez
(74) *Attorney, Agent, or Firm* — Yee & Associates, P.C.

(57) ABSTRACT

The illustrative embodiments disclose a pressure bulkhead system comprising an aft pressure bulkhead, skin splice angles, and stringer splice angles. The aft pressure bulkhead has an outer compression ring. The skin splice angles are positioned adjacent to one another and joined to the outer compression ring. The skin splice angles form a joint between a first section of a fuselage, a second section of the fuselage, and the aft pressure bulkhead. The stringer splice angles join the skin splice angles to a stringer in the second section of the fuselage.

20 Claims, 10 Drawing Sheets

PRESSURE BULKHEAD SYSTEM

BACKGROUND INFORMATION

1. Field

The present disclosure relates generally to pressure bulkheads for aircraft applications. More specifically, the present disclosure relates to a pressure bulkhead system joining an aft pressure bulkhead to two sections of an aircraft.

2. Background

Pressure bulkheads are often used in aircraft to separate a pressurized section of the fuselage from an unpressurized section. In some applications, the pressure bulkhead is mounted to the skin of one or more sections of the fuselage.

Due to various forces applied during operation of the aircraft, as well as the certification requirements set out by aviation certification agencies, these joints are typically complicated and heavily reinforced. Joint reinforcement may include multiple assemblies, machined parts, failsafe angles, outer break rings, stringer splice fittings, chords, or clips. One or more of these parts may have different types of material. Such configurations often increase the weight and complexity of the joint more than desired.

As the complexity of the assembly increases, manufacturing time also increases. Manufacturing and installation for pressure bulkheads may involve many processes, such as drilling, deburring, shimming, and fay surface sealing. Considerable labor hours are needed to meet all structural requirements of a multiple material stack up.

Therefore, it would be desirable to have a method and apparatus that takes into account at least some of the issues discussed above, as well as other possible issues.

SUMMARY

An embodiment of the present disclosure provides a pressure bulkhead system comprising an aft pressure bulkhead, skin splice angles, and stringer splice angles. The aft pressure bulkhead has an outer compression ring. The skin splice angles are positioned adjacent to one another and joined to the pressure bulkhead outer compression ring. The skin splice angles form a joint between a first section of a fuselage, a second section of the fuselage, and the aft pressure bulkhead. The stringer splice angles join the skin splice angles to a stringer in the second section of the fuselage and provides stiffness across the sections joint.

Another illustrative embodiment of the present disclosure provides a method for forming a fuselage of an aircraft. Skin splice angles are fastened to an outer compression ring of an aft pressure bulkhead. The skin splice angles are then fastened to an inner surface of a first skin of a first section of the fuselage. A second section of the fuselage is positioned adjacent to the first section such that a portion of skin splice angles overlaps an inner surface of a second skin of the second section. A plurality of holes is drilled from an outer surface of the second skin through the skin splice angles. The skin splice angles are fastened to the second skin to form a joint between the aft pressure bulkhead, the first section of the fuselage, and the second section of the fuselage.

A further illustrative embodiment of the present disclosure provides an aircraft comprising a fuselage and a pressure bulkhead system. The fuselage has an unpressurized section and a pressurized section. The pressure bulkhead system comprises an aft pressure bulkhead, skin splice angles, and stringer splice angles. The aft pressure bulkhead separates a first section and a second section. The aft pressure bulkhead has an outer compression ring. The skin splice angles are positioned adjacent to one another and joined to the outer compression ring. The skin splice angles form a joint between the first section of the fuselage, the second section of the fuselage, and the aft pressure bulkhead. The stringer splice angles join the skin splice angles to a stringer in the second section of the fuselage.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the manufacturing and installation process for an aft pressure bulkhead is more complex, more time-consuming, and more expensive than desired. Some currently used applications require joint assemblies having many parts made of different materials.

For example, in some implementations, both composite and metal materials are arranged in a stack up and then holes are drilled through the materials. A stack up having dissimilar materials, substantially increases the duration of the installation process. As an example, drilling through metal takes longer than with some other types of materials. Additionally, more steps are required when metal is used in the stack up. The metal parts must be disassembled and deburred then put back in place to be fastened. In other examples, some parts must be sealed to prevent corrosion due to dissimilar material in the stack up, adding more steps to the installation process.

In some currently used systems, one assembly is used on the pressurized side of the bulkhead and a separate assembly is used on the unpressurized side of the bulkhead. Using multiple assemblies further complicates the process, resulting in longer installation times when joining the bulkhead to two different sections of the aircraft.

In the aft section of the aircraft, the current sequence and type of installation processes are not conducive to automation and thus, must be completed by human technicians. Due to the integration configuration of the aft pressure bulkhead joint, holes must be drilled from the inside. With the currently used configuration, access is limited such that automated units cannot be used to drill holes for the joint. Lack of automation increases the number of labor hours needed to complete a section of the aircraft.

In addition, some applications contemplate a single bulkhead-to-skin connector running radially along the edge of the bulkhead. This connector may be known as a skin splice angle. Challenges arise in making such assemblies fail-safe. Safety requirements often call for parts to have reinforcement such that the system continues to function as desired even when one portion of the assembly fails. Under stress, an assembly with a single bulkhead-to-skin connector may fail without additional reinforcement, thus making the assembly unable to be certified for flight.

The disclosed embodiments relate to a pressure bulkhead system that uses a single part to integrate two joints. The pressure bulkhead system joins the aft pressure bulkhead and two sections of the fuselage, creating a pressure seal between the two sections. The illustrative embodiments can be used in a wide variety of aircraft applications to provide the desired level of reinforcement for certification.

Figure 1:
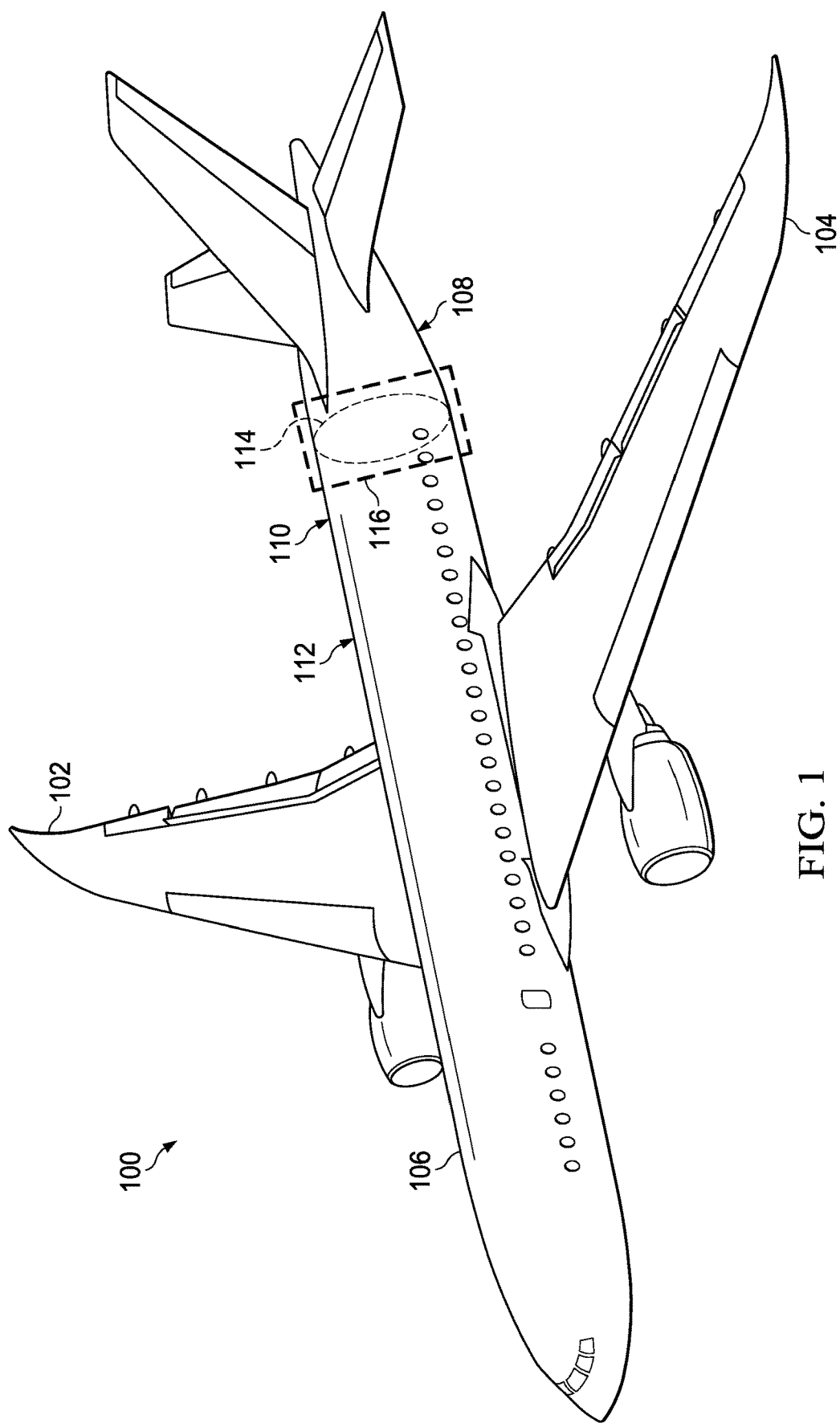
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to fuselage 106.

Fuselage 106 has section 108 and section 110. Skin 112 of fuselage 106 is comprised of a composite material. Aft pressure bulkhead 114 separates section 108 from section 110 in portion 116 of fuselage 106. Aircraft 100 in an example of an aircraft in which a pressure bulkhead system may be implemented in accordance with an illustrative embodiment.

Figure 2:
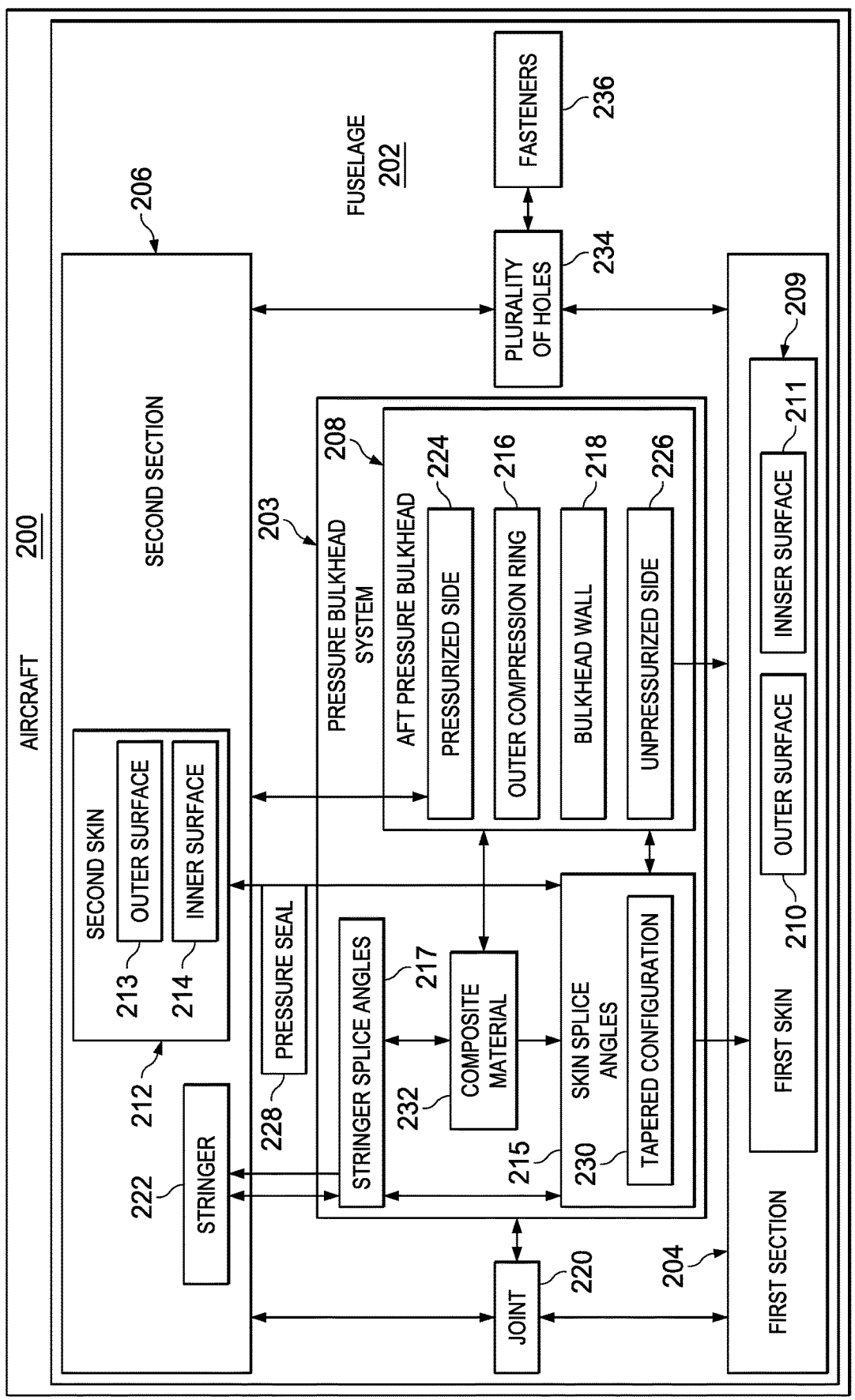
FIG. 2 is an illustration of a block diagram of an aircraft in accordance with an illustrative embodiment.

Turning now to FIG. 2, an illustration of a block diagram of an aircraft is depicted in accordance with an illustrative embodiment. Aircraft 200 comprises fuselage 202 and pressure bulkhead system 203.

In this illustrative example, fuselage 202 has first section 204 and second section 206. First section 204 and second section 206 are in the aft portion of aircraft 200. First section 204 is an unpressurized section of fuselage 202 and second section 206 is a pressurized section of fuselage 202 in this illustrative example. For example, second section 206 may be a pressurized cabin. In some illustrative examples, both sections may be unpressurized.

Fuselage 202 may have a number of additional sections, depending on the implementation. As used herein, "a number of," when used with reference to items, means one or more items. Thus, a number of sections includes one or more sections.

Some sections of fuselage 202 may be separated by a bulkhead. First section 204 and second section 206 are separated by aft pressure bulkhead 208 in this illustrative example.

First section 204 has first skin 209 with outer surface 210 and inner surface 211. Second section 206 has second skin 212 with outer surface 213 and inner surface 214.

In this illustrative example, pressure bulkhead system 203 comprises aft pressure bulkhead 208, skin splice angles 215, and stringer splice angles 217. Pressure bulkhead system 203 is configured to join first section 204, second section 206, and aft pressure bulkhead 208 using skin splice angles 215. In this manner, a joint between first section 204, second section 206, and aft pressure bulkhead 208 is created using a single type of part.

Aft pressure bulkhead 208 may be attached to inner surface 211 of first skin 209 in first section 204 and inner surface 214 of second skin 212 in second section 206 of fuselage 202 by using skin splice angles 215. Aft pressure bulkhead 208 is attached to first skin 209 and second skin 212 such that aft pressure bulkhead 208 does not shift in an undesired manner during operation of aircraft 200.

As depicted, aft pressure bulkhead 208 has outer compression ring 216 and bulkhead wall 218. Outer compression ring 216 is thicker than bulkhead wall 218. Outer compression ring 216 is located radially along the circumference of aft pressure bulkhead 208. When installed in aircraft 200, skin splice angles 215 attach first skin 209 and second skin 212 to outer compression ring 216.

Outer compression ring 216 is configured to reinforce aft pressure bulkhead 208. Specifically, outer compression ring 216 is configured to balance stresses sustained by bulkhead wall 218 in response to a pressure differential across bulkhead wall 218. Both outer compression ring 216 and bulkhead wall 218 may be comprised of a composite material. For example, without limitation, outer compression ring 216 and bulkhead wall 218 may be comprised of a composite fiber reinforced plastic material suitable for aircraft applications.

Outer compression ring 216 may be a separate piece from bulkhead wall 218 or the two items may be formed as one piece, with outer compression ring 216 having more layers of material than bulkhead wall 218 to account for its thickness. When outer compression ring 216 and bulkhead wall 218 are formed as one, the thickness may taper from the outer edge of outer compression ring 216 toward the center of bulkhead wall 218 in a desired manner. Aft pressure bulkhead 208 may have one or more additional sections, rings, or materials in other illustrative examples.

Skin splice angles 215 are positioned adjacent to one another in this illustrative example. Skin splice angles 215 are joined to outer compression ring 216. Skin splice angles 215 form joint 220 between first section 204 of fuselage 202, second section 206 of fuselage 202, and aft pressure bulkhead 208. In particular, skin splice angles 215 connect outer compression ring 216 of aft pressure bulkhead 208 to first skin 209 and second skin 212.

In this illustrative example, skin splice angles 215 are segmented pieces of material. More than one skin splice angle is used such that if one skin splice angle fails, aircraft 200 can continue to operate. If one splice angle, or a long piece of material, was used to connect aft pressure bulkhead 208 to first skin 209 or second skin 212, a crack in one portion may cause the entire part to fail. Thus, using a single elongated skin splice along the joint may not provide the desired level of fail safety. Segmented parts are needed.

Skin splice angles 215 are joined to outer compression ring 216 on pressurized side 224 of aft pressure bulkhead 208 in this illustrative example. As depicted, none of skin splice angles 215 are used on unpressurized side 226 of aft pressure bulkhead 208.

In addition to joining aft pressure bulkhead 208 to fuselage 202, skin splice angles 215 form pressure seal 228 for second section 206 of fuselage 202. Pressure seal 228 is an air tight seal in this illustrative example. In other words, pressurization can be maintained on pressurized side 224 by using skin splice angles 215 and associated fasteners.

Skin splice angles 215 may have tapered configuration 230. Tapered configuration 230 may include one or more tapers on a portion of a flange of each skin splice angle. Such tapered configuration is shown in greater detail in FIG. 5.

In this illustrative example, each of skin splice angles 215 has a first tapered flange on its forward side. Each skin splice angle tapers from its center to the edge connecting it to the skin of the pressurized section of fuselage 202. The taper on the forward flange is configured to provide a desired level of load transfer performance between parts and reduce or eliminate the need for shimming.

In some cases, each of skin splice angles 215 also has a second tapered flange on the portion of the skin splice angle that attaches to outer compression ring 216. A second tapered flange is optional.

As depicted, stringer splice angles 217 join skin splice angles 215 to stringer 222 in second section 206 of fuselage 202. Stringer splice angles 217 add a level of reinforcement to joint 220. In this manner, the combination of skin splice angles 215 and stringer splice angles 217 join aft pressure bulkhead 208 to first section 204 and second section 206 in a desired manner.

In this illustrative example, aft pressure bulkhead 208, outer compression ring 216, skin splice angles 215, and stringer splice angles 217 are comprised exclusively of composite material 232. Composite material 232 may be a material selected from at least one of a thermoplastic material, a thermoset material, fiberglass, carbon fiber reinforced plastic, or other suitable types of composite material. Each part may be comprised of one or more different types of composite material 232.

As used herein, the phrase "at least one of," when used with a list of items, means different combinations of one or more of the listed items may be used, and only one of each item in the list may be needed. In other words, "at least one of" means any combination of items and number of items may be used from the list, but not all the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

Since each component of pressure bulkhead system 203 is comprised of a composite material, the number of processes needed to install pressure bulkhead system 203 and join first section 204 to second section 206 may be reduced. For example, as only one possible order of assembly, plurality of holes 234 may be drilled from outer surface 213 of second skin 212 of second section 206 of fuselage 202 through skin splice angles 215 when all components are in place. Fasteners 236 may then be positioned within plurality of holes 234 to join second skin 212 of second section 206 of fuselage 202 to skin splice angles 215. Fasteners 236 also may secure stringer splice angles 217 to skin splice angles 215 and stringer 222. In this example, aft pressure bulkhead 208 and skin splice angles 215 can be preassembled and then attached to other portions of fuselage 202. Of course, the components within pressure bulkhead system 203 and fuselage 202 may be assembled in various manners.

Since no metal material is used, the components need not be disassembled to be deburred. Heavy parts remain in place and can be secured without moving and subsequent realignment. Not only does this process decrease installation time, it allows automation and drilling from outside instead of manual drilling from the inside. Manufacturing costs and labor hours may be substantially reduced as compared to currently used techniques.

Further, the use of pressure bulkhead system 203 decreases the number of parts required to form and reinforce joint 220. Components are not used on unpressurized side 226 of aft pressure bulkhead 208. In other words, no additional parts are used on the aft side (unpressurized side) of the aft pressure bulkhead 208. With currently used applications, getting to the area on the aft (unpressurized) side of the bulkhead at this joint is difficult and time consuming. The illustrative embodiments alleviate the need to do so. Further, pressure bulkhead system 203 provides a pressure seal that integrates two joints with one set of skin splice angles.

Figure 3:
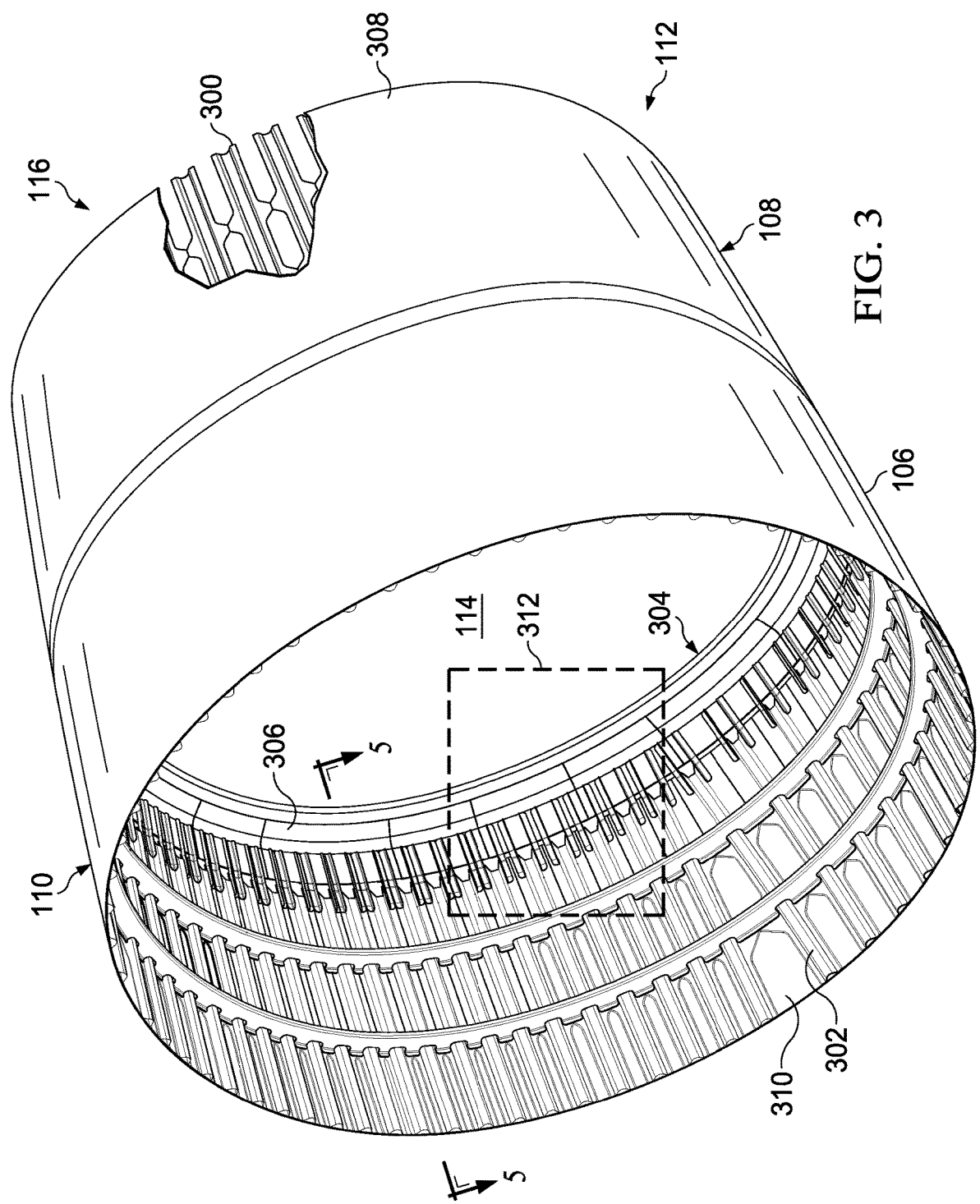
FIG. 3 is an illustration of a portion of a fuselage of an aircraft in accordance with an illustrative embodiment.

With reference to FIG. 3, an illustration of a portion of a fuselage of an aircraft is depicted in accordance with an illustrative embodiment. In this illustrative example, portion 116 of fuselage 106 from FIG. 1 is shown in greater detail.

Stringers 300 in section 108 and stringers 302 in section 110 are exposed in this view. Aft pressure bulkhead 114 separates section 108 and section 110. Section 108 may correspond to an unpressurized section in aircraft 100. Section 110 may correspond to a pressurized section in aircraft 100.

Pressure bulkhead system 304 connects aft pressure bulkhead 114, section 108, and section 110 at joint 306 in this illustrative example. Pressure bulkhead system 304 and the components within, aft pressure bulkhead 114, section 108, and section 110, are examples of physical implementations for pressure bulkhead system 203 and its components, aft pressure bulkhead 208, first section 204, and second section 206 shown in block form in FIG. 2.

In this illustrative example, section 108 is unpressurized and section 110 is pressurized. Pressure bulkhead system 304 is installed on the pressurized side of aft pressure bulkhead 114. Section 108 has skin 308 and section 110 has skin 310. Portion 312 of pressure bulkhead system 304 is shown. Pressure bulkhead system 304 joins section 108 and section 110 around the entire circumference of aft pressure bulkhead 114.

Figure 4:
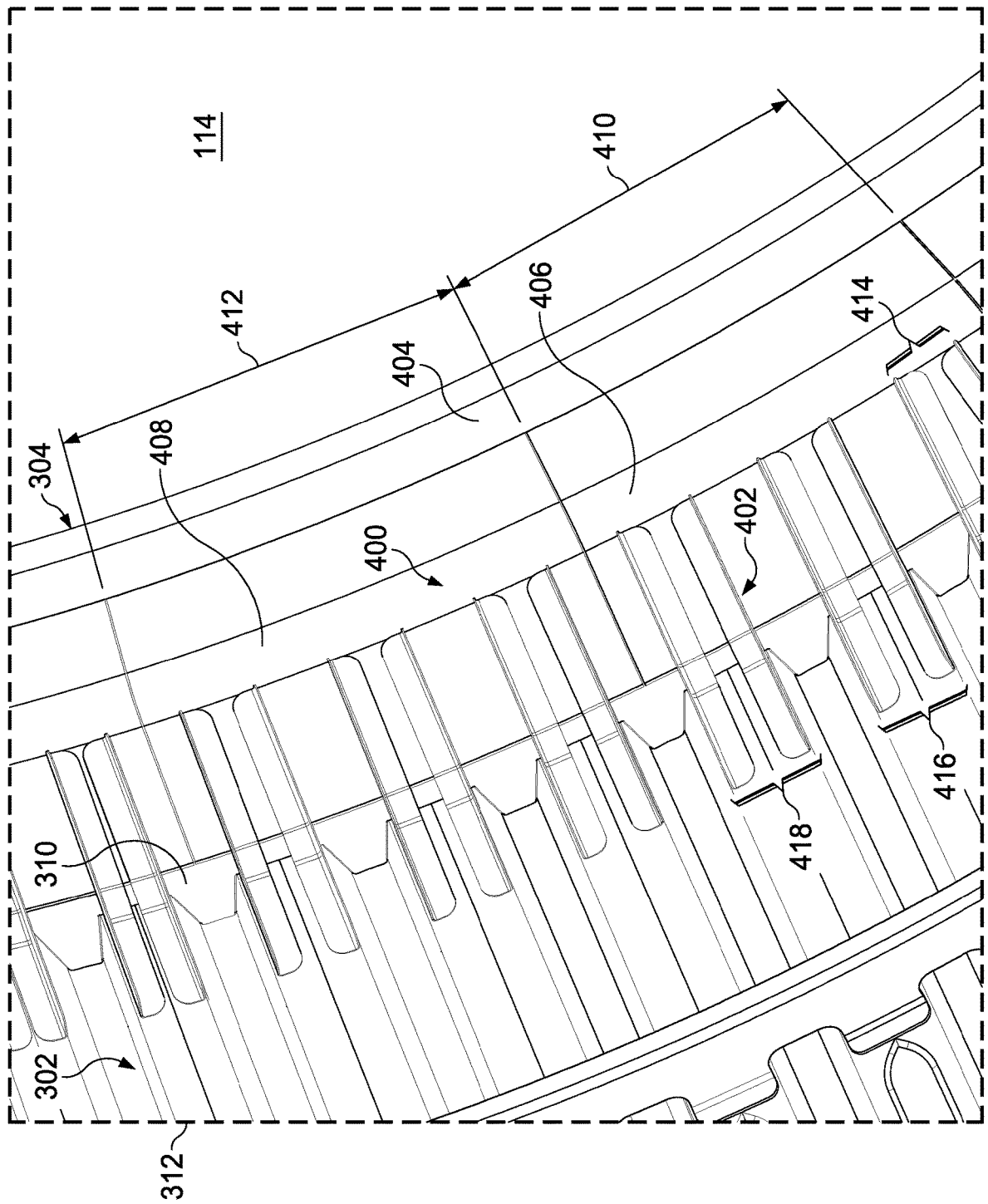
FIG. 4 is an illustration of a portion of a pressure bulkhead system in accordance with an illustrative embodiment.

Turning next to FIG. 4, an illustration of a portion of a pressure bulkhead system is depicted in accordance with an illustrative embodiment. Portion 312 of pressure bulkhead system 304 is shown in greater detail in this view.

As depicted, pressure bulkhead system 304 has aft pressure bulkhead 114, skin splice angles 400, and stringer splice angles 402. Aft pressure bulkhead 114 comprises outer compression ring 404. Skin splice angles 400 join skin 310 of section 110 of fuselage 106 to outer compression ring 404 of aft pressure bulkhead 114.

Skin splice angle 406 and skin splice angle 408 are shown in this view. Both skin splice angle 406 and skin splice angle 408 join fuselage 106 to outer compression ring 404 of aft pressure bulkhead 114. Skin splice angle 406 has width 410 and skin splice angle 408 has width 412. Width 410 and width 412 may be the same, in this illustrative example, such that skin splice angles 400 may be mass produced. In other illustrative examples, each of skin splice angles 400 may have a different width to achieve the desired level of performance.

In this illustrative example, stringer splice angles 402 join stringers 302 to skin splice angles 400. Multiple pairs of stringer splice angles 402 join stringers 302 to each of skin splice angles 400. For example, pair 414, pair 416, and pair 418 of stringer splice angles 402 join skin splice angle 406 to stringers 302.

Although three pairs of stringer splice angles 402 are shown per one skin splice angle, other numbers are possible. In some instances, stringers 302 may be joined to skin splice angles 400 using a u-channel or other part instead of a pair of stringer splice angles 402.

As shown in this view, the shape of skin splice angles 400 is such that a portion overlaps outer compression ring 404 and another portion overlaps skin 310 of section 110 of fuselage 106. Skin splice angles 400 are positioned adjacent to one another along the circumference of aft pressure bulkhead 114.

Figure 5:
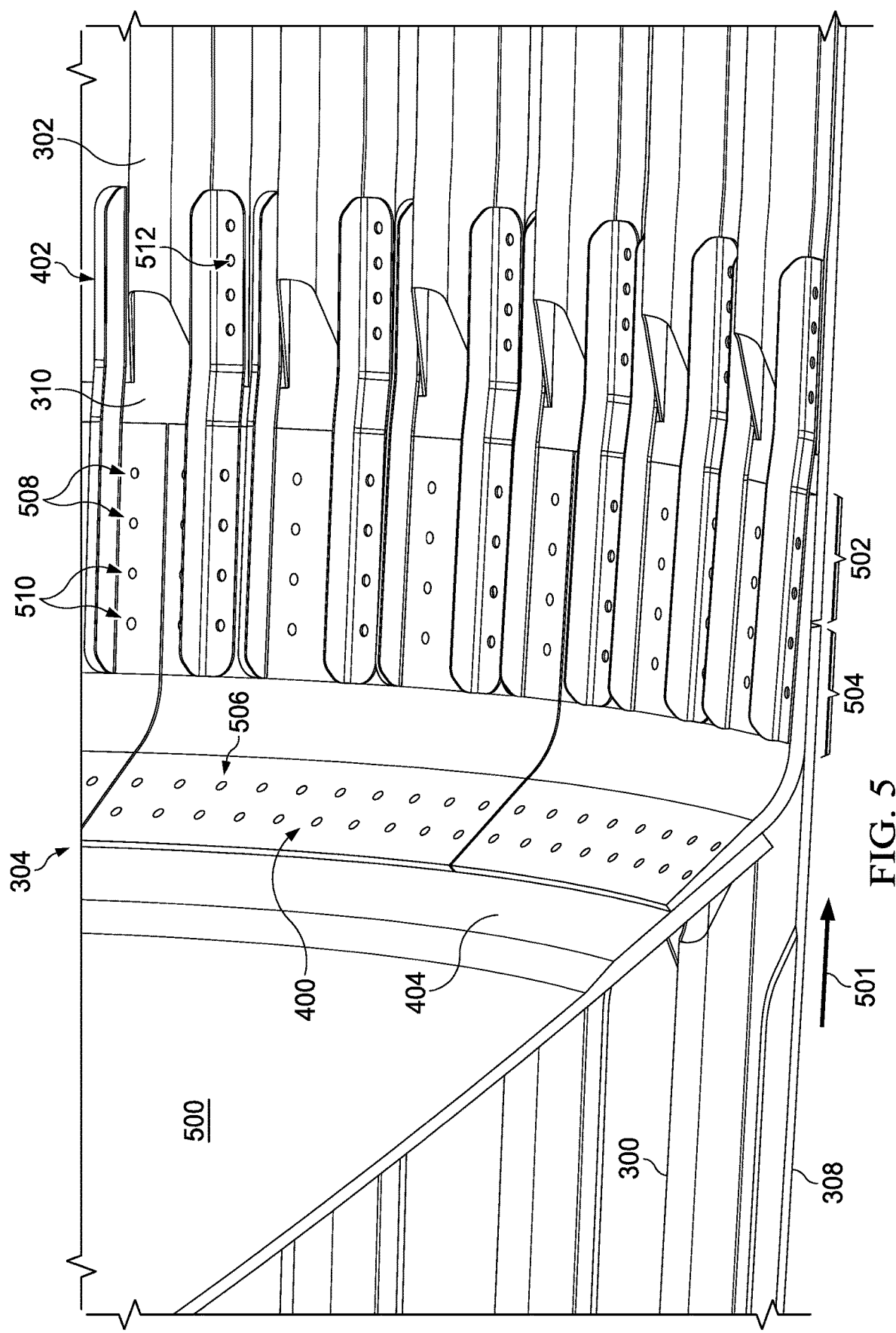
FIG. 5 is an illustration of a cross-sectional view of a pressure bulkhead system in accordance with an illustrative embodiment.

In FIG. 5, an illustration of a cross-sectional view of a pressure bulkhead system is depicted in accordance with an illustrative embodiment. In this illustration, a cross-sectional view of pressure bulkhead system 304 is shown along the lines 5-5 in FIG. 3. Arrow 501 indicates the direction of the forward portion of the aircraft.

As depicted, outer compression ring 404 in aft pressure bulkhead 114 may be seen in greater detail. The thickness of outer compression ring 404 is greater than the thickness of bulkhead wall 500 as shown in this view. Although outer compression ring 404 and bulkhead wall 500 are shown as one piece having varying thicknesses in this example, in other examples, outer compression ring 404 may be a separate piece.

Skin splice angles 400 overlap portion 502 of skin 310 of section 110 as well as portion 504 of skin 308 of section 108. In this manner, skin splice angles 400 join all three parts together. Skin splice angles 400 taper slightly in thickness toward the edges. However, tapering is optional in the flange that connects each of skin splice angles 400 to outer compression ring 404.

This view shows holes 506 drilled through outer compression ring 404 and skin splice angles 400 (two rows). Holes 508 have been drilled through skin 310, skin splice angles 400, and stringer splice angles 402 (two rows). Holes 510 have been drilled through skin 308, skin splice angles 400, and stringer splice angles 402 (two rows). Holes 512 have been drilled through skin 310, stringer splice angles 402, and stringers 302 (four rows). Although the illustrative examples show two rows for holes 506, holes 508, and holes 510, and four rows for holes 512, other numbers of rows may be used, depending on the implementation.

During installation, skin splice angles 400 may be attached to aft pressure bulkhead 114 first. The assembly is then attached to section 108. Section 110 is then positioned adjacent to section 108 such that skin splice angles 400 overlap portion 502 of skin 310. Holes 508 are drilled from the outer surface of skin 310 through skin splice angles 400 and stringer splice angles 402 at the same time.

Figure 6:
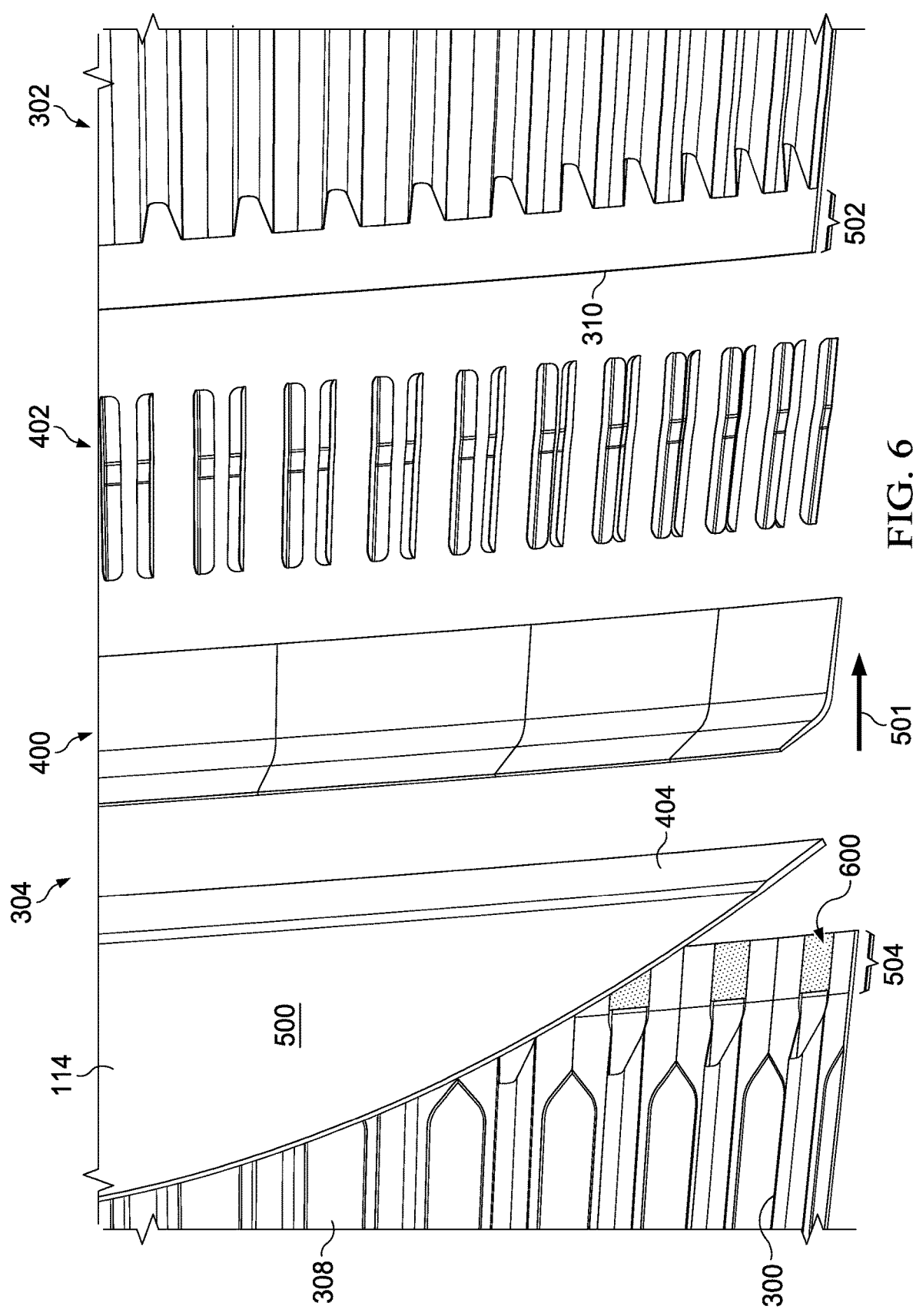
FIG. 6 is an illustration of an exploded view of a pressure bulkhead system in accordance with an illustrative embodiment.

With reference to FIG. 6, an illustration of an exploded view of a pressure bulkhead assembly is depicted in accordance with an illustrative embodiment. Portion 502 of skin 310 and portion 504 of skin 308 with stringers 300 is seen in greater detail.

In this view, reinforcement feature 600 is shown. Reinforcement feature 600 may have at least one layer of composite material associated with skin 310 of section 110 of fuselage 106. Reinforcement feature 600 may be comprised of at least one of a thermoset material, a thermoplastic material, fiberglass, or some other suitable type of composite material. In an illustrative example, reinforcement feature 600 is configured to reinforce the joint and reduce the need for shimming. Reinforcement feature 600 is optional.

As shown in this view, no skin splice angles, stringer splice angles, fasteners, brackets, clamps, or other parts are used on the aft side (unpressurized side) of aft pressure bulkhead 114 to join the two sections to together with the bulkhead. All parts necessary to integrate the joint are located on the pressurized side of aft pressure bulkhead 114 in these illustrative examples.

Figure 7:
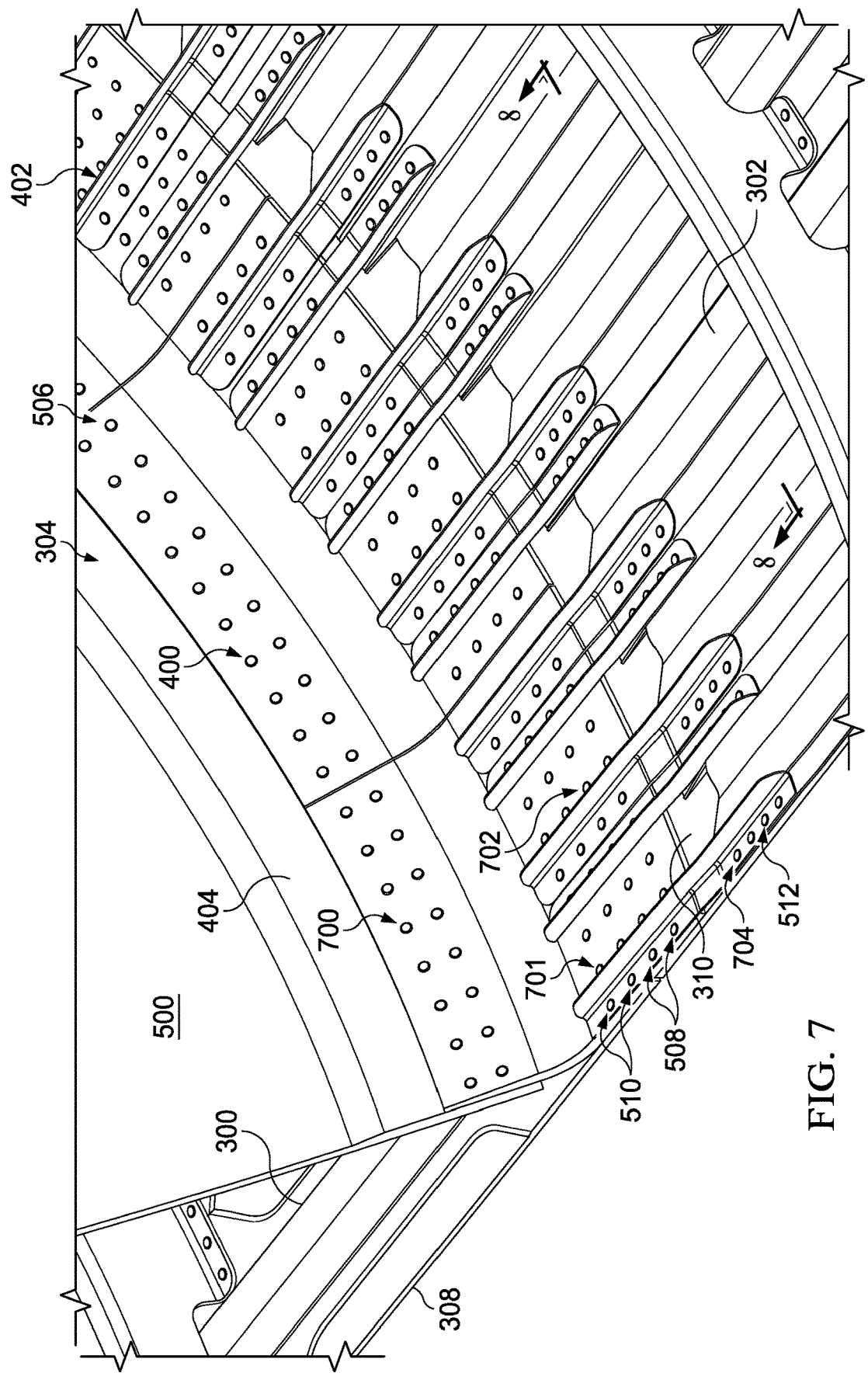
FIG. 7 is an illustration of a perspective view of a pressure bulkhead system installed in an aircraft in accordance with an illustrative embodiment.

Turning to FIG. 7, an illustration of a perspective view of a pressure bulkhead system installed in an aircraft is depicted in accordance with an illustrative embodiment.

As depicted, fasteners 700 are installed in holes 506. Fasteners 701 are installed in holes 510. Fasteners 702 have been installed in holes 508 and fasteners 704 have been installed in holes 512. No additional reinforcement or security is needed on the unpressurized side of aft pressure bulkhead 114.

Figure 8:
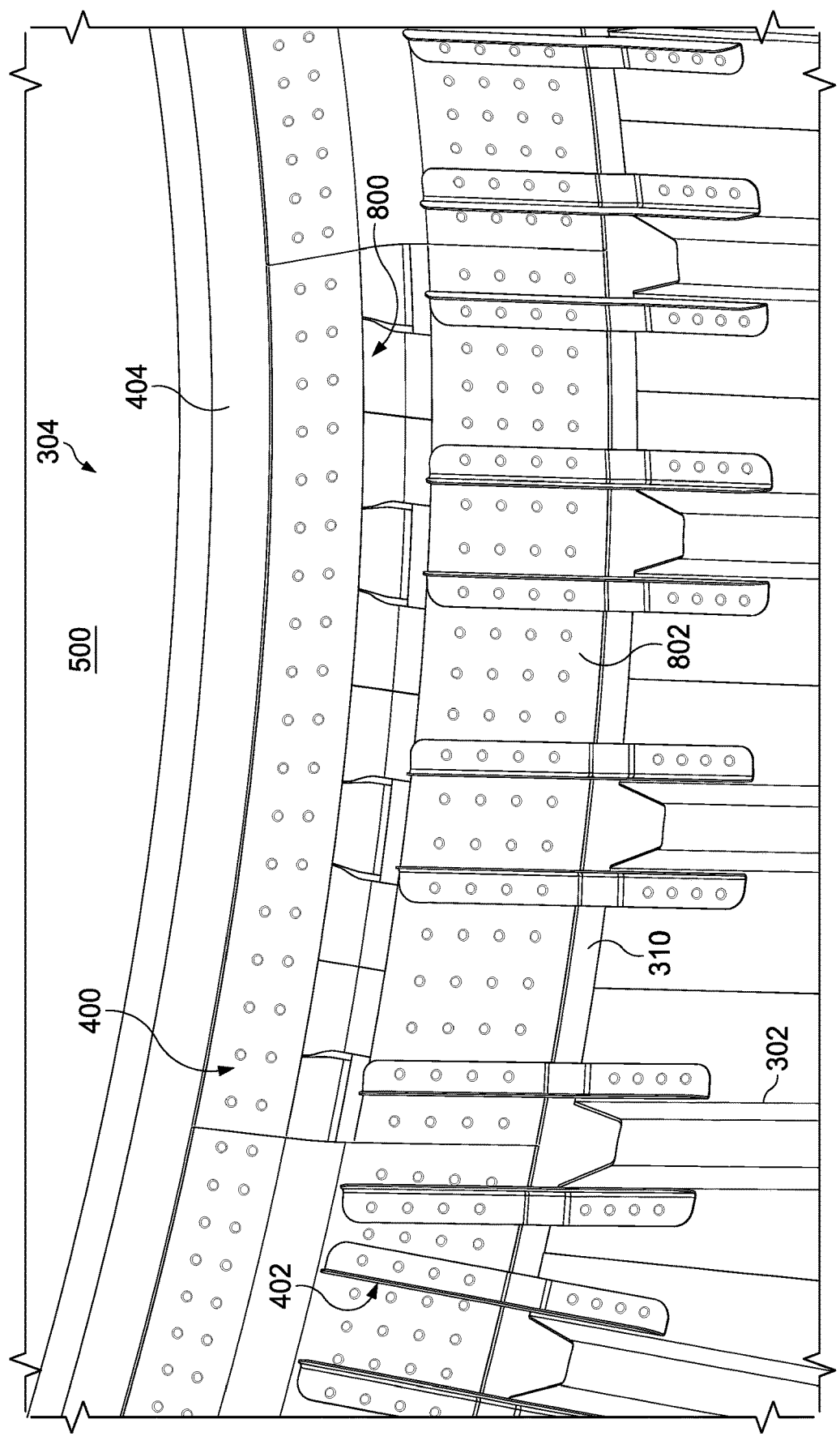
FIG. 8 is an illustration of a pressure bulkhead system with a gap in accordance with an illustrative embodiment.

In FIG. 8, an illustration of a pressure bulkhead assembly with a gap is depicted in accordance with an illustrative embodiment. Pressure bulkhead system 304 is shown in the direction of view lines 8-8 in FIG. 7.

In this view, gap 800 is present in skin splice angle 802. Gap 800 may represent a failure of skin splice angle 802. Since skin splice angle 802 is only one piece in the segmented skin splice, the system continues to function. As pressure seeps out of gap 800, total pressure may hold for a desired amount of time to meet Federal Aviation Administration certification requirements.

Aircraft 100 in FIG. 1 is only one physical implementation of a platform incorporating pressure bulkhead system 203 shown in FIG. 2. Although the examples for an illustrative embodiment are described with respect to an aircraft, the illustrative embodiment may be applied to other types of platforms. Pressure bulkhead system 203 in FIG. 2 may be used in any platform where a bulkhead is present. The platform may be, for example, a mobile platform, a stationary platform, a land-based structure, an aquatic-based structure, or a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms.

The different components shown in FIG. 1 and FIGS. 3-8 may be combined with components in FIG. 2, used with components in FIG. 2, or a combination of the two. Additionally, some of the components in FIG. 1 and FIGS. 3-8 may be illustrative examples of how components shown in block form in FIG. 2 may be implemented as physical structures.

Figure 9:
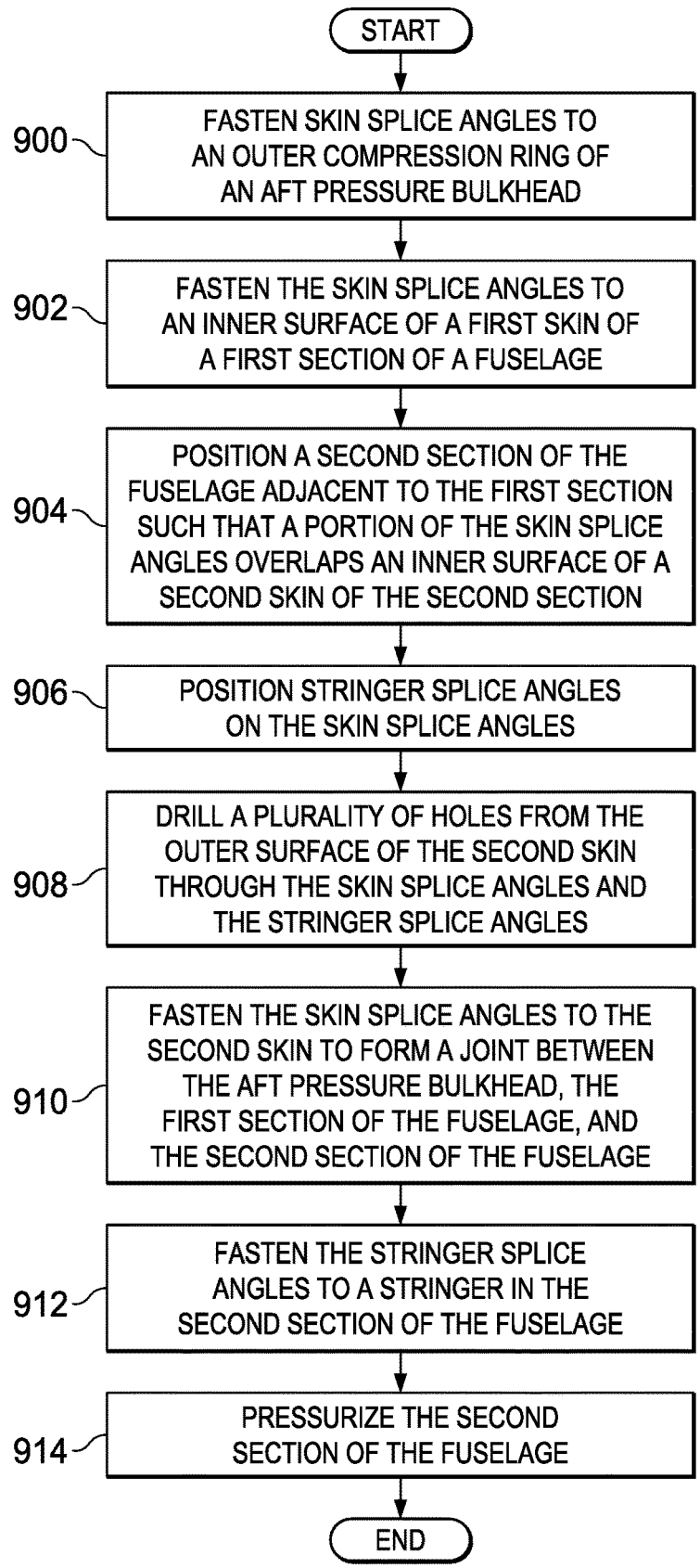
FIG. 9 is an illustration of a flowchart of a process for forming a fuselage of an aircraft in accordance with an illustrative embodiment.

With reference next to FIG. 9, an illustration of a flowchart of a process for forming a fuselage of an aircraft is depicted in accordance with an illustrative embodiment. The method depicted in FIG. 9 is just one example of a method that may be used to form fuselage 202 of aircraft 200 shown in FIG. 2.

The process begins by fastening skin splice angles to an outer compression ring of an aft pressure bulkhead (operation 900). The skin splice angles are then fastened to an inner surface of a first skin of a first section of a fuselage (operation 902).

A second section of the fuselage is positioned adjacent to the first section such that a portion of skin splice angles overlaps an inner surface of a second skin of the second section (operation 904). Next, stringer splice angles are positioned on the skin splice angles (operation 906).

A plurality of holes is drilled from the outer surface of the second skin through the skin splice angles and the stringer splice angles (operation 908). Operation 908 may be completed using an automated manufacturing tool, such as a robotic arm. The plurality of holes is drilled through the second skin, the skin splice angles, and the stringer splice angles at substantially the same time. Prior to installation, as described herein, the aft pressure bulkhead, the compression ring, the skin splice angles, and the stringer splice angles are formed from a composite material.

The skin splice angles are then fastened to the second skin to form a joint between the aft pressure bulkhead, the first section of the fuselage, and the second section of the fuselage (operation 910). Operation 910 may also include fastening the stringer splice angles to the skin splice angles.

Finally, the stringer splice angles are fastened to a stringer in the second section of the fuselage (operation 912). The second section of the fuselage is pressurized (operation 914), with the process terminating thereafter. The first section of the fuselage remains unpressurized.

The method disclosed in FIG. 9 is just one sequence of installation processes for a pressure bulkhead system. In another illustrative example, skin splice angles may first be attached to an aft pressure bulkhead and then attached to the pressurized section of the fuselage (prior to pressurization). Then, the entire assembly may be attached to the unpressurized section of the fuselage.

In yet another sequence, skin splice angles are attached to the pressurized side of the fuselage first. Next, the aft pressure bulkhead is attached to the skin splice angles and, thereafter, the skin splice angles are attached to the unpressurized section of the fuselage. Of course, other sequences are possible. The sequences disclosed herein, with reference to installation of a pressure bulkhead system, are not exhaustive.

Figure 10:
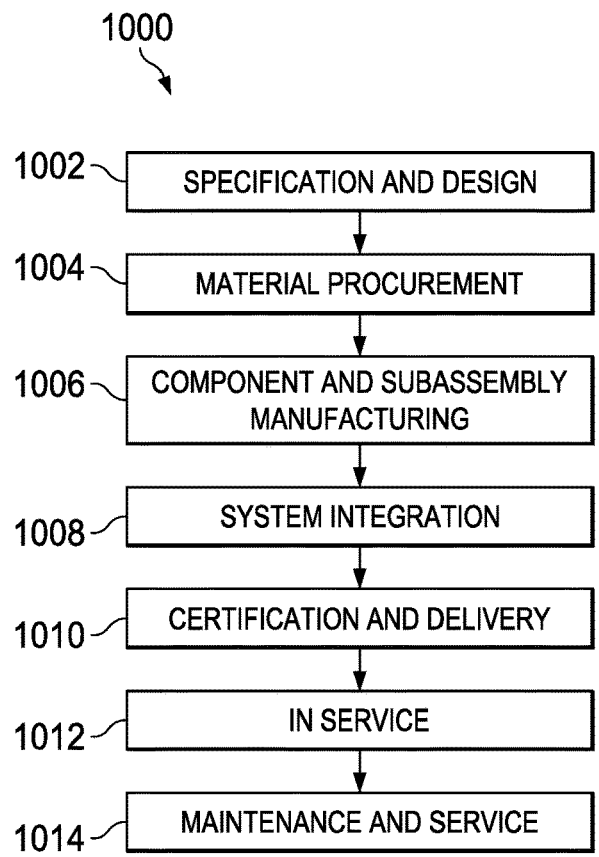
FIG. 10 is an illustration of a block diagram of an aircraft manufacturing and service method in accordance with an illustrative embodiment.
Figure 11:
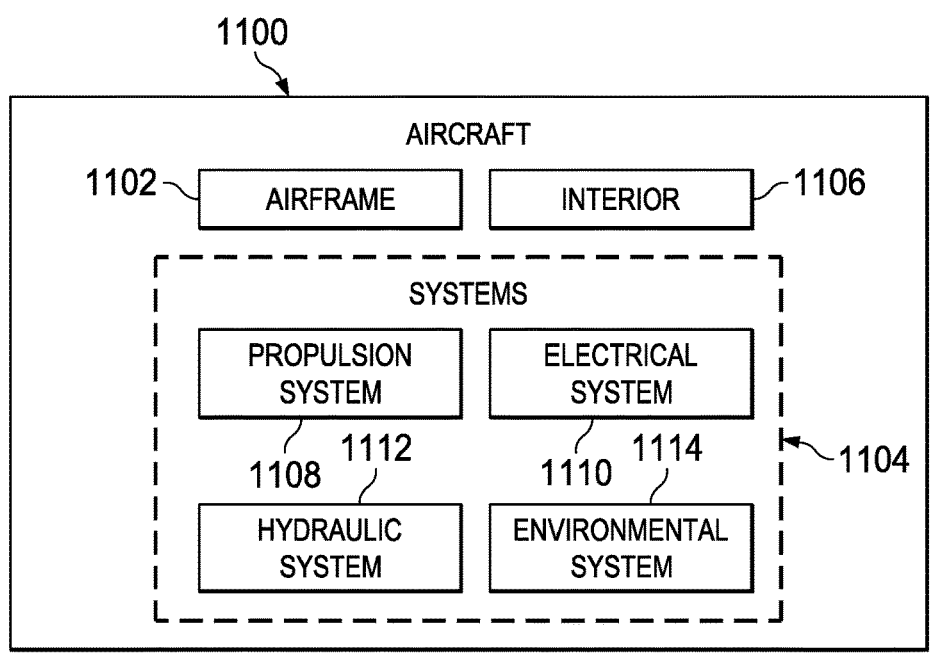
FIG. 11 is an illustration of a block diagram of an aircraft in which an illustrative embodiment may be implemented.

The illustrative embodiments of the disclosure may be described in the context of aircraft manufacturing and service method 1000 as shown in FIG. 10 and aircraft 1100 as shown in FIG. 11. Turning first to FIG. 10, an illustration of a block diagram of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Pressure bulkhead system 203 from FIG. 2 and the components within pressure bulkhead system 203 may be made during component and subassembly manufacturing 1006. In addition, one or more components in pressure bulkhead system 203 in FIG. 2 may be added during routine maintenance and service 1014 as part of a modification, reconfiguration, or refurbishment of aircraft 1100 in FIG. 11.

Each of the processes of aircraft manufacturing and service method 1000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of a block diagram of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10. In one illustrative example, components or subassemblies produced in component and subassembly manufacturing 1006 in FIG. 10 may be fabricated or manufactured in a manner similar to components or subassemblies produced while aircraft 1100 is in service 1012 in FIG. 10. As yet another example, one or more apparatus embodiments, method embodiments, or a combination thereof may be utilized during production stages, such as component and subassembly manufacturing 1006 and system integration 1008 in FIG. 10.

One or more apparatus embodiments, method embodiments, or a combination thereof may be utilized while aircraft 1100 is in service 1012, during maintenance and service 1014 in FIG. 10, or both. The use of a number of the different illustrative embodiments may substantially expedite the assembly of aircraft 1100, reduce the cost of aircraft 1100, or both expedite the assembly of aircraft 1100 and reduce the cost of aircraft 1100.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The illustrative embodiments decrease the cost, complexity, and manpower needed to assemble fuselage 202 of aircraft 200 in FIG. 2. Pressure bulkhead system 203 in FIG. 2 integrates two joints and a pressure seal in one. The number of parts needed to assemble joint 220 in FIG. 2 to meet desired specifications is reduced.

The use of composite material 232 for all parts in the stack up allows plurality of holes 234 to be drilled from outer surface 213 in second skin 212 inward, making it possible to automate the assembly of two sections of fuselage 202 and aft pressure bulkhead 208 in FIG. 2. Since no metal materials are used, large portions of joint 220 in FIG. 2 do not need to be moved, processed, and realigned before fastening. Thus, the illustrative embodiments save time and reduce cost.

The weight of fuselage 202 may be reduced with the elimination of various parts and metal materials. In addition, the cost and time it takes to manufacture parts is reduced as the parts are made from composite materials. The illustrative embodiments meet all Federal Aviation Administration requirements including fail safety and damage tolerance.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A pressure bulkhead system comprising:
   an aft pressure bulkhead having an outer compression ring;
   a plurality of skin splice angles positioned adjacent to one another and joined to the outer compression ring, wherein each of the plurality of skin splice angles define a tapered configuration including one or more tapers on a portion of a flange of each skin splice angle, wherein the plurality of skin splice angles form a joint between a first section of a fuselage, a second section of the fuselage, and the aft pressure bulkhead; and
   a plurality of pairs of stringer splice angles joining the plurality of skin splice angles to a plurality of stringers in the second section of the fuselage,
   wherein each pair of stringer splice angles is connected to and located between a consecutive two of the plurality of stringers in the second section of the fuselage, and
   wherein each member of each pair of the plurality of pairs of stringer splice angles includes a surface disposed to conform to the one or more tapers on the portion of the flange of each skin splice angle wherein multiple pairs of stringer splice angles join each of the plurality of stringers to each of the plurality of skin splice angles.

2. The pressure bulkhead system of claim 1, wherein the first section of the fuselage is unpressurized and the second section of the fuselage is pressurized.

3. The pressure bulkhead system of claim 1, wherein the plurality of skin splice angles are joined to the outer compression ring on a pressurized side of the aft pressure bulkhead.

4. The pressure bulkhead system of claim 3, wherein the aft pressure bulkhead, the outer compression ring, the plurality of skin splice angles, and the stringer splice angles are comprised of a composite material.

5. The pressure bulkhead system of claim 1, wherein the plurality of skin splice angles form a pressure seal for the second section of the fuselage.

6. The pressure bulkhead system of claim 1, wherein the plurality of skin splice angles have a tapered configuration.

7. The pressure bulkhead system of claim 1 further comprising:
   a reinforcement feature having at least one layer of composite material and associated with a skin of the first section of the fuselage.

8. A method for forming a fuselage of an aircraft, the method comprising:
   fastening a plurality of skin splice angles to an outer compression ring of an aft pressure bulkhead, wherein each of the plurality of skin splice angles define a tapered configuration including one or more tapers on a portion of a flange of each skin splice angle;
   fastening the plurality of skin splice angles to an inner surface of a first skin of a first section of the fuselage;
   positioning a second section of the fuselage adjacent to the first section such that a portion of the plurality of skin splice angles overlaps an inner surface of a second skin of the second section;
   drilling a plurality of holes from an outer surface of the second skin through the plurality of skin splice angles;
   fastening the plurality of skin splice angles to the second skin to form a joint between the aft pressure bulkhead, the first section of the fuselage, and the second section of the fuselage;
   fastening a plurality of pairs of stringer splice angles to the plurality of skin splice angles; and
   fastening the plurality of pairs of stringer splice angles to a plurality of stringers in the second section of the fuselage,
   wherein each pair of stringer splice angles is connected to and located between a consecutive two of the plurality of stringers in the second section of the fuselage, and
   wherein each member of each pair of the plurality of pairs of stringer splice angles includes a surface disposed to conform to the one or more tapers on the portion of the flange of each skin splice angle wherein multiple pairs of stringer splice angles join each of the plurality of stringers to each of the plurality of skin splice angles.

9. The method of claim 8, wherein the drilling comprises:
   drilling the plurality of holes through the second skin, the plurality of skin splice angles, and the stringer splice angles at substantially the same time.

10. The method of claim 8 further comprising:
    forming the aft pressure bulkhead, the outer compression ring, the plurality of skin splice angles, and the stringer splice angles from a composite material.

11. The method of claim 8 further comprising:
    pressurizing the second section of the fuselage, wherein the first section of the fuselage is unpressurized.

12. The method of claim 8, wherein the fastening of the plurality of skin splice angles comprises:
    fastening the plurality of skin splice angles to the outer compression ring on a pressurized side of the aft pressure bulkhead.

13. An aircraft comprising:
    a fuselage having a first section and a second section; and
    a pressure bulkhead system comprising:
    an aft pressure bulkhead separating a first section and a second section, wherein the aft pressure bulkhead has an outer compression ring;

a plurality of skin splice angles positioned adjacent to one another and joined to the outer compression ring, wherein each of the plurality of skin splice angles define a tapered configuration including one or more tapers on a portion of a flange of each skin splice angle, wherein the plurality of skin splice angles form a joint between the first section of the fuselage, the second section of the fuselage, and the aft pressure bulkhead; and a plurality of pairs of stringer splice angles joining the plurality of skin splice angles to a plurality of stringers in the second section of the fuselage, wherein each pair of stringer splice angles is connected to and located between a consecutive two of the plurality of stringers in the second section of the fuselage, and wherein each member of each pair of the plurality of pairs of stringer splice angles includes a surface disposed to conform to the one or more tapers on the portion of the flange of each skin splice angle wherein multiple pairs of stringer splice angles join each of the plurality of stringers to each of the plurality of skin splice angles.

14. The aircraft of claim 13, wherein the first section of the fuselage is an unpressurized section and the second section of the fuselage is a pressurized section.

15. The aircraft of claim 13, wherein the plurality of skin splice angles are joined to the outer compression ring on a pressurized side of the aft pressure bulkhead.

16. The aircraft of claim 15, wherein the aft pressure bulkhead, the outer compression ring, the plurality of skin splice angles, and the stringer splice angles are comprised of a composite material.

17. The aircraft of claim 13, wherein the plurality of skin splice angles form a pressure seal for the second section of the fuselage.

18. The aircraft of claim 13 further comprising:
a reinforcement feature having at least one layer of composite material and associated with a skin of the first section of the fuselage.

19. The aircraft of claim 13 further comprising:
a plurality of holes drilled from an outer surface of a skin of the second section of the fuselage through the plurality of skin splice angles; and
fasteners positioned within the plurality of holes and configured to join the skin of the second section of the fuselage to the plurality of skin splice angles.

20. The method of claim 8 further comprising:
providing a reinforcement feature having at least one layer of composite material and associated with a skin of the first section of the fuselage.

* * * * *